United States Patent
dos Santos (10) Patent No.: US 10,418,914 B2
(45) Date of Patent: Sep. 17, 2019

(54) MICROINVERTER

(71) Applicant: Indiana University Research and Technology Corp., Indianapolis, IN (US)

(72) Inventor: Euzeli dos Santos, Indianapolis, IN (US)

(73) Assignee: Indiana University Research & Technology Corporation, Indianapolis, IN (US)

( * ) Notice: Subject to any disclaimer, the term of this patent is extended or adjusted under 35 U.S.C. 154(b) by 313 days.

(21) Appl. No.: 14/871,085

(22) Filed: Sep. 30, 2015

(65) Prior Publication Data

US 2016/0181939 A1    Jun. 23, 2016

Related U.S. Application Data (60) Provisional application No. 62/057,445, filed on Sep. 30, 2014.

(51) Int. Cl.
*H02S 40/32* (2014.01)
*H02M 7/537* (2006.01)
(Continued)

(52) U.S. Cl.
CPC ........... *H02M 7/003* (2013.01); *H02M 7/483* (2013.01); *H02M 7/537* (2013.01); *H02S 40/32* (2014.12)

(58) Field of Classification Search
CPC ........ H02M 7/003; H02S 40/32; H02S 40/34; H02S 40/345
See application file for complete search history.

(56) References Cited

U.S. PATENT DOCUMENTS 4,392,009 A * 7/1983 Napoli .................. H01L 31/048
136/244
5,280,133 A * 1/1994 Nath ..................... H01L 31/048
136/251
(Continued)

FOREIGN PATENT DOCUMENTS

| CN | 202918180 U | * | 5/2013 | |
| WO | WO 2010019754 A2 | * | 2/2010 | ............. F24J 2/5211 |
| WO | WO 2016014042 A1 | * | 1/2016 | ............. H02S 40/32 |

OTHER PUBLICATIONS

J. Salmon et al., "PWM inverters using split-wound coupled inductors", IEEE Transactions on Industry Applications 45(6), p. 2001-2009 (2009).*

(Continued)

*Primary Examiner* — Eric R Smith
(74) *Attorney, Agent, or Firm* — Faegre Baker Daniels LLP (57) ABSTRACT

A microinverter comprises a housing, a cover configured to connect to the housing, and electronics mounted within the housing to convert direct current from a solar panel to alternative current. The housing includes a first side wall, a second side wall perpendicular to the first side wall, and a mounting flange extending from the side walls, the mounting flange including a first channel configured to receive a first rail segment of the solar panel, a second channel configured to receive a second rail segment of the solar panel, and a mounting tab disposed between the channels to receive a fastener extending through one of the rail segments, thereby securing the housing to the solar panel with a single fastener.

18 Claims, 13 Drawing Sheets

(51) Int. Cl.
*H02M 7/483* (2007.01)
*H02M 7/00* (2006.01)

(56) References Cited

U.S. PATENT DOCUMENTS

| | | | | |
|---|---|---|---|---|
| 6,066,796 A * | 5/2000 | Itoyama | H01L 31/02008 | 136/251 |
| 2006/0243318 A1 * | 11/2006 | Feldmeier | H02S 40/34 | 136/244 |
| 2009/0183760 A1 * | 7/2009 | Meyer | H01L 31/02008 | 136/244 |
| 2010/0147362 A1 * | 6/2010 | King | F24J 2/4614 | 136/251 |
| 2011/0011641 A1 * | 1/2011 | Pfeffer | H05K 7/20409 | 174/547 |
| 2011/0275244 A1 * | 11/2011 | Duesterhoeft | H01R 13/113 | 439/620.21 |
| 2012/0057388 A1 * | 3/2012 | Garrity | H02M 3/338 | 363/144 |
| 2013/0074909 A1 * | 3/2013 | Sheng | H01L 31/042 | 136/251 |
| 2014/0000186 A1 * | 1/2014 | Yen | F16B 5/0635 | 52/173.3 |
| 2014/0168927 A1 * | 6/2014 | Morris | H05K 13/00 | 361/807 |

OTHER PUBLICATIONS

Definition of fastener [retrieved from http://www.dictionary.com/browse/fastener?s=t on Feb. 2, 2018].*

Ardani, Kristen, et al., "Benchmarking Non-Hardware Balance of System (Soft) Costs for U.S. Photovoltaic Systems Using a Data-Driven Analysis from PV Installer Survey Results", SunShot, U.S. Department of Energy, National Renewable Energy Laboratory, Berkeley, CA—Lawrence Berkeley National Laboratory, Nov. 2012, Available electronically at http://www.osti.gov/bridge, 35 pages.

Deline, Chris, "Partially Shaded Operation of Multi-String Photovoltaic Systems", IEEE, 2010, 6 pages.

Hernandez-Moro, J., et al., "Analytical model for solar PV and CSP electricity costs: Present LCOE values and their future evolution", Renewable and Sustainable Energy Reviews 20, (2013), pp. 119-132.

Sher, Hadeed Ahmed, "Micro-inverters—Promising solutions in solar photovoltaics", Energy for Sustainable Development 16, (2012); pp. 389-400.

Trabosh, Herman K., "Better Racking Drives Down Solar's Soft Costs", Jan. 2, 2014, Available electronically at http://www.greentechmedia.com/articles/read/Better-Racking-Drives-Down-Solars-Soft-Costs; 4 pages.

Wiser, Ryan, et al., "The Impact of City-level Permitting Processes on Residential Photovoltaic Installation Prices and Development Times: An Empirical Analysis of Solar Systems in California Cities", Ernest Orlando Lawrence Berkeley National Laboratory, Apr. 2013, Available electronically at http://emp.lbl.gov/reports, 41 pages.

Yuan, Xiaoming, et al., "Status and Opportunities of Photovoltaic Inverters in Grid-Tied and Micro-Grid Systems", IEEE, 2006; 4 pages.

* cited by examiner

MICROINVERTER

CROSS-REFERENCE TO RELATED APPLICATIONS

This application claims priority to U.S. Provisional Application Ser. No. 62/057,445, entitled "Microinverter," filed on Sep. 30, 2014, the entire disclosure of which is hereby expressly incorporated by reference. This application also references U.S. patent application Ser. No. 14/465,289, entitled "Five-Level Four-Switch DC-AC Converter," filed Aug. 21, 2014, the entire disclosure of which is hereby expressly incorporated by reference.

TECHNICAL FIELD

The present invention relates to solar microinverters and in particular to a solar microinverter having a housing configured for rapid mounting using a single fastener.

BACKGROUND AND SUMMARY OF THE DISCLOSURE

Solar power is a popular alternative energy source. Many photovoltaic systems including solar panels have been installed residentially and commercially over the past several years. In general, the solar panels convert light into direct current which can be stored in a battery and/or converted to alternating current for use by a consumer or delivery to an electrical grid. As with many technologies, the costs associated with solar systems have decreased over time. However, the cost of such systems, including the cost of installation remains relatively high.

In some solar systems, multiple solar panels are connected to a central inverter device which converts the direct current from the panels into alternating current. The panels are strung together in "Christmas light" fashion and the last panel is connected to the central inverter. While this approach has some benefits, the overall electrical output of the entire array may be greatly reduced by an obstruction of light (e.g., shade, debris, snow, etc.) to or malfunction of even a single panel. Consequently, many systems use microinverters mounted to each solar panel. In a microinverter system, the direct current from each panel is converted to alternating current. As such, if one panel is obstructed or defective, its performance has no effect on the other panels in the array.

One challenge to adoption of microinverter systems is cost. In some systems, many dozens of microinverters are required, and each must be installed onto a separate solar panel. The labor for attaching microinverters to solar panels constitutes a significant portion of the overall installation costs. Known microinverters require the use of at least two fasteners to secure the microinverter to the solar panel. As such, it would be desirable to provide a microinverter that reduces the time, and therefore the cost, required to secure the microinverter to a solar panel.

In one embodiment, the present disclosure provides a microinverter, comprising a housing, a cover configured to connect to the housing, and electronics mounted within the housing to convert direct current from a solar panel to alternative current. The housing includes a first side wall, a second side wall perpendicular to the first side wall, and a mounting flange extending from the side walls. The mounting flange includes a first channel configured to receive a first rail segment of the solar panel, a second channel configured to receive a second rail segment of the solar panel, and a mounting tab disposed between the channels to receive a fastener extending through one of the rail segments. The configuration of the housing facilitates securing the housing to the solar panel with a single fastener.

BRIEF DESCRIPTION OF THE DRAWINGS

Embodiments of the present invention will now be described, by way of example only, with reference to the accompanying drawings, in which.

DETAILED DESCRIPTION OF EMBODIMENTS OF THE DISCLOSURE

The embodiments described below are merely exemplary and are not intended to limit the invention to the precise forms disclosed. Instead, the embodiments were selected for description to enable one of ordinary skill in the art to practice the invention.

Figure 1:
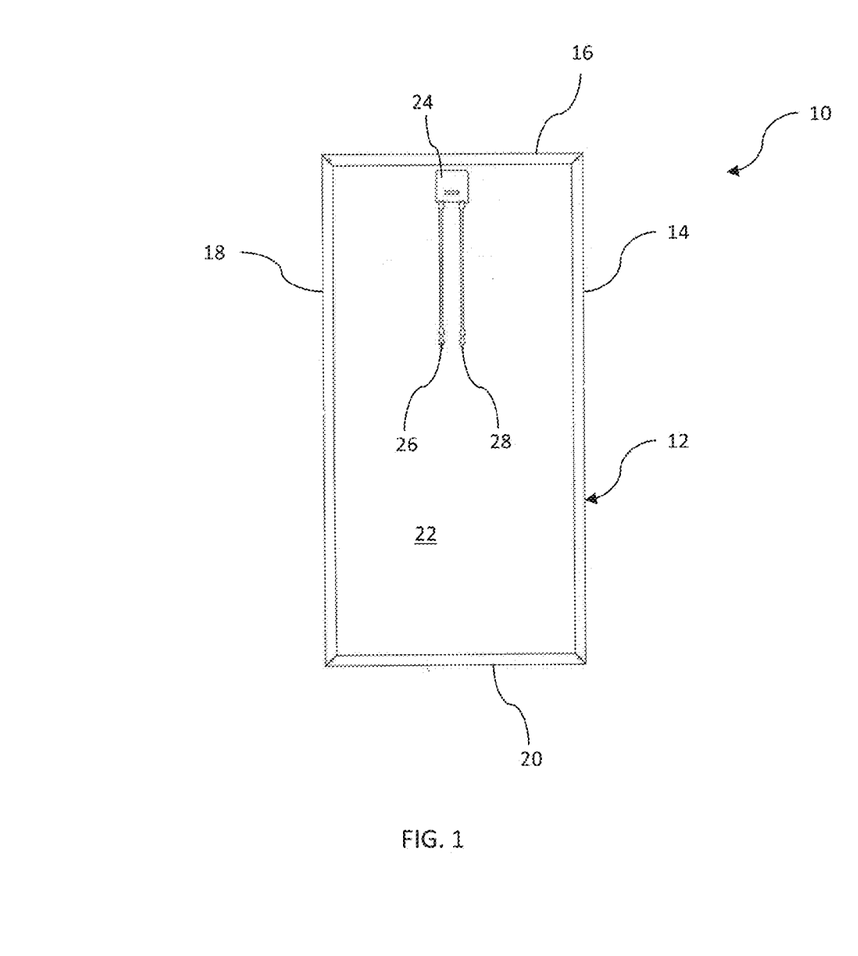
FIG. 1 is a rear view of a solar panel.

Referring now to FIG. 1, a rear view of a typical solar panel is shown. Solar panel 10 generally includes an outer rail 12 including four rail segments 14, 16, 18, 20 connected together in a rectangular configuration. The panel body 22 is mounted to outer rail 12. Panel 10 further includes an output junction box 24 that electrically connects the DC outputs of the photovoltaic cells of panel 10 to a positive DC cable 26 and a negative DC cable 28.

Figure 2:
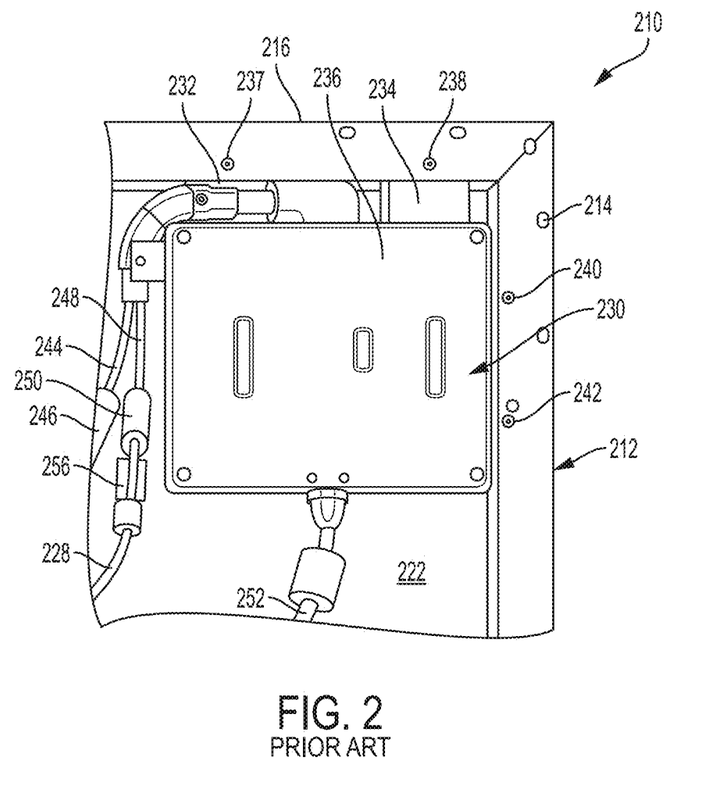
FIG. 2 is a rear view of a prior art microinverter mounted to a solar panel.

FIG. 2 depicts a solar panel with a prior art microinverter 30. As shown, microinverter 30 includes mounting blocks 32, 34 (only two shown) which extend from a housing 36. Two blocks (not shown) extend below rail segment 14 and two blocks 32, 34 extend below rail segment 16. A fastener or screw 37, 38, 40, 42 is placed through the rail segments 14, 16 into each of the blocks to secure microinverter 30 to outer rail 12. Microinverter 30 further includes a cable including positive DC input wire 44 connected to connector 46, negative DC input wire 48 connected to connector 50 and an AC output wire 52. Connector 46 is connected to a connector 54 (FIG. 3) of positive DC cable 26 and connector 50 is connected to connector 56 of negative DC cable 28. As should be apparent from the foregoing, mounting of microinverter 30 requires alignment of four fasteners 36, 38, 40, 42, which requires time, expense and effort during the solar panel installation process.

Figure 3:
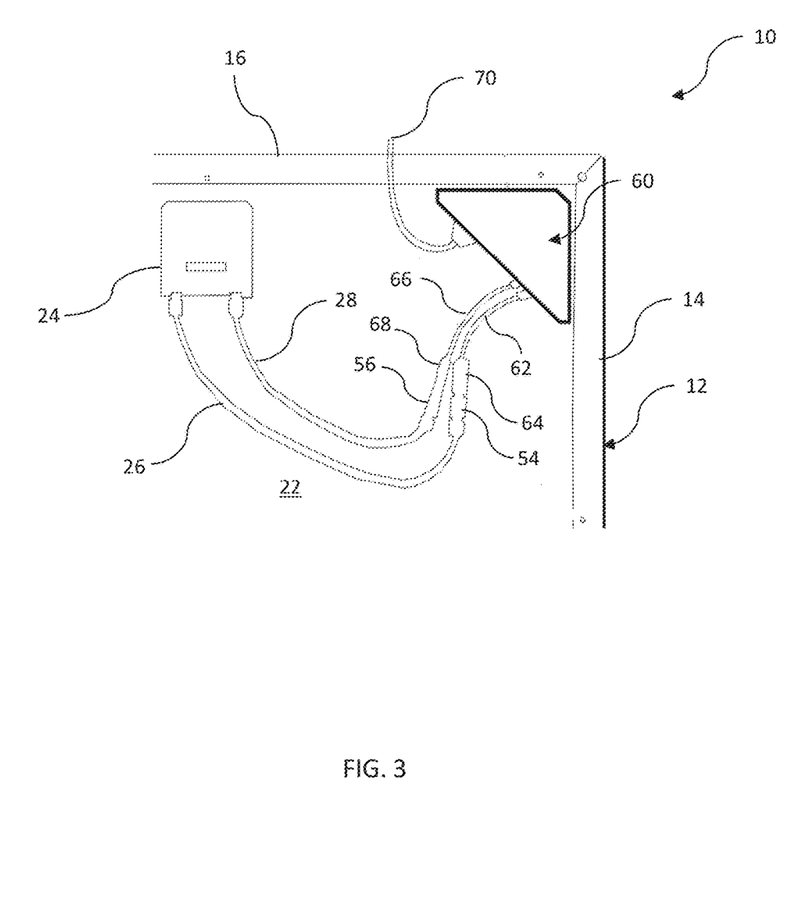
FIG. 3 is a partial rear view of a microinverter according to the present disclosure mounted to a solar panel.

Referring now to FIG. 3, one embodiment of a microinverter 60 according to the present disclosure is shown mounted to outer rail 12 of solar panel 10. As shown and discussed in greater detail below, microinverter 60 is triangular in shape and configured for mounting in the corner formed by rail segments 14, 16 of outer rail 12. Microinverter 60 includes a positive DC input wire 62 connected to a connecter 64 which mates with connector 54 of positive DC cable 26, and a negative DC input wire 66 connected to a connector 68 which mates with connector 56 of negative DC cable 28. Microinverter 60 further includes an AC output wire 70.

Figure 4:
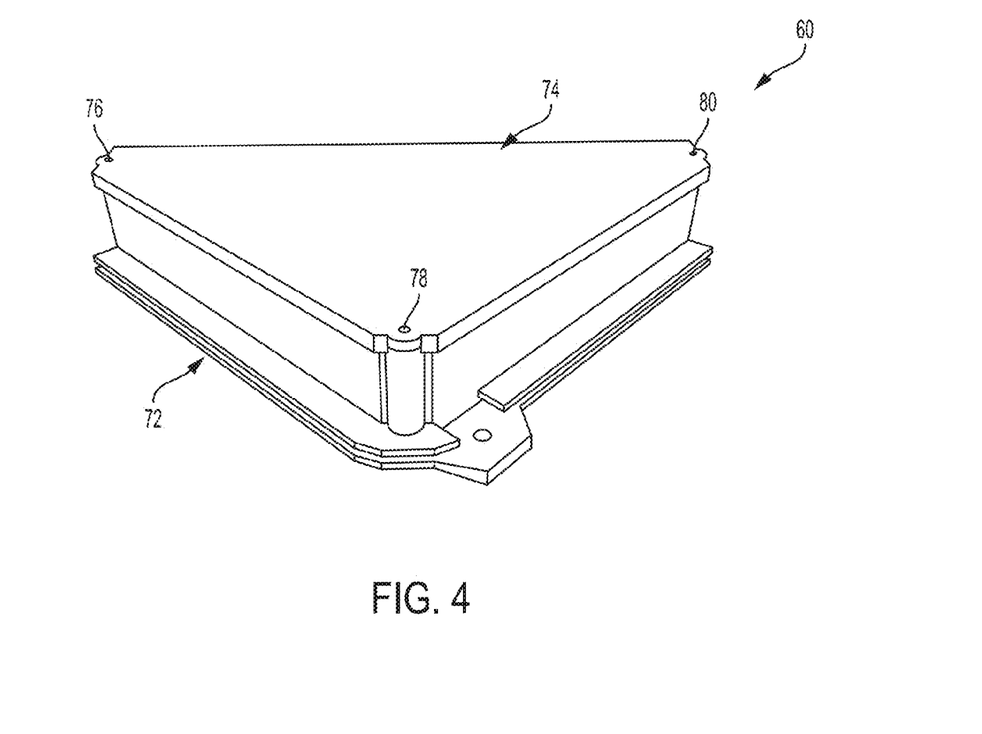
FIG. 4 is a perspective view of the microinverter of FIG. 3.

FIG. 4 depicts further details of microinverter 60. As shown, microinverter 60 generally includes a housing 72 and a cover 74. In one embodiment, housing 72 is made of molded plastic and cover 74 is formed from sheet aluminum. Any other suitable materials may be used. As is further described below, cover 74 includes openings 76, 78, 80 for receiving fasteners to secure cover 74 to housing 72.

Figure 5:
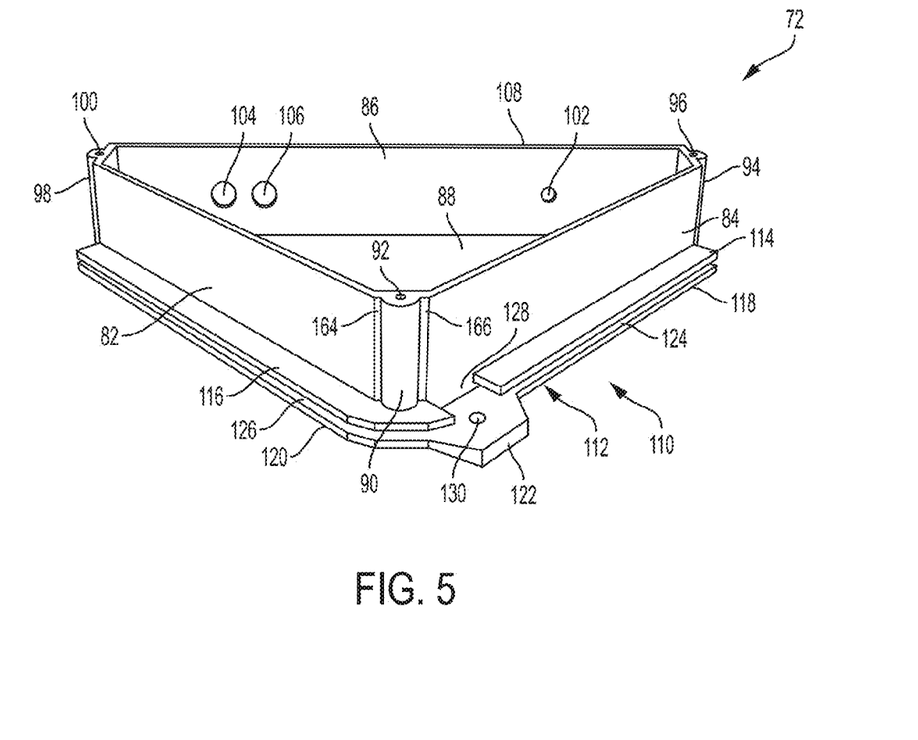
FIG. 5 is a perspective view of a housing of the microinverter of FIGS. 3 and 4.

Referring now to FIG. 5, housing 72 generally includes side walls 82, 84, 86 and end wall 88 that extends between side walls 82, 84, 86. Side wall 82 is connected to side wall 84 by a corner section 90 which includes a bore 92 for receiving a cover fastener. Similarly, side wall 84 is connected to side wall 86 by a corner section 94 which includes a bore 96 for receiving a cover fastener, and side wall 86 is connected to side wall 82 by a corner section 98 which includes a bore 100 for receiving a cover fastener. Side wall 86 includes an opening 102 for receiving AC output wire 70, an opening 104 for receiving positive DC input wire 62, and an opening 106 for receiving negative DC input wire 66. Together, side walls 82, 84, 86 form an upper edge 108 of housing 72.

Housing 72 also includes a mounting flange generally denoted by number 110. Flange 110 includes a lower wall 112, a first upper wall segment 114 and a second upper wall segment 116. Lower wall 112 includes a first wall segment 118, a second wall segment 120 and a mounting tab 122 formed between segment 118 and segment 120. First wall segment 118 extends perpendicularly from side wall 84 in substantially parallel relationship to first upper wall segment 114, which also extends perpendicularly from side wall 84, thereby forming a channel 124 between segments 118 and 114. Second wall segment 120 similarly extends perpendicularly from side wall 82 in substantially parallel relationship to second upper wall segment 116, which extends perpendicularly from side wall 82, thereby forming a channel 126 between segments 120 and 116. Second upper wall segment 116 extends around corner section 90 and terminates to form a gap 128 with the terminating end of first upper wall segment 114. Second wall segment 120 also extends around corner section 90, thereby extending channel 126 around corner section 90. Mounting tab 122 extends between wall segments 118, 120 and projects farther outwardly from side wall 84 than wall segments 118, 120. Mounting tab 122 also includes an opening 130 disposed below gap 128 for receiving a mounting faster to secure housing 72 to outer rail 12 of solar panel 10 as is further described below.

Figure 6:
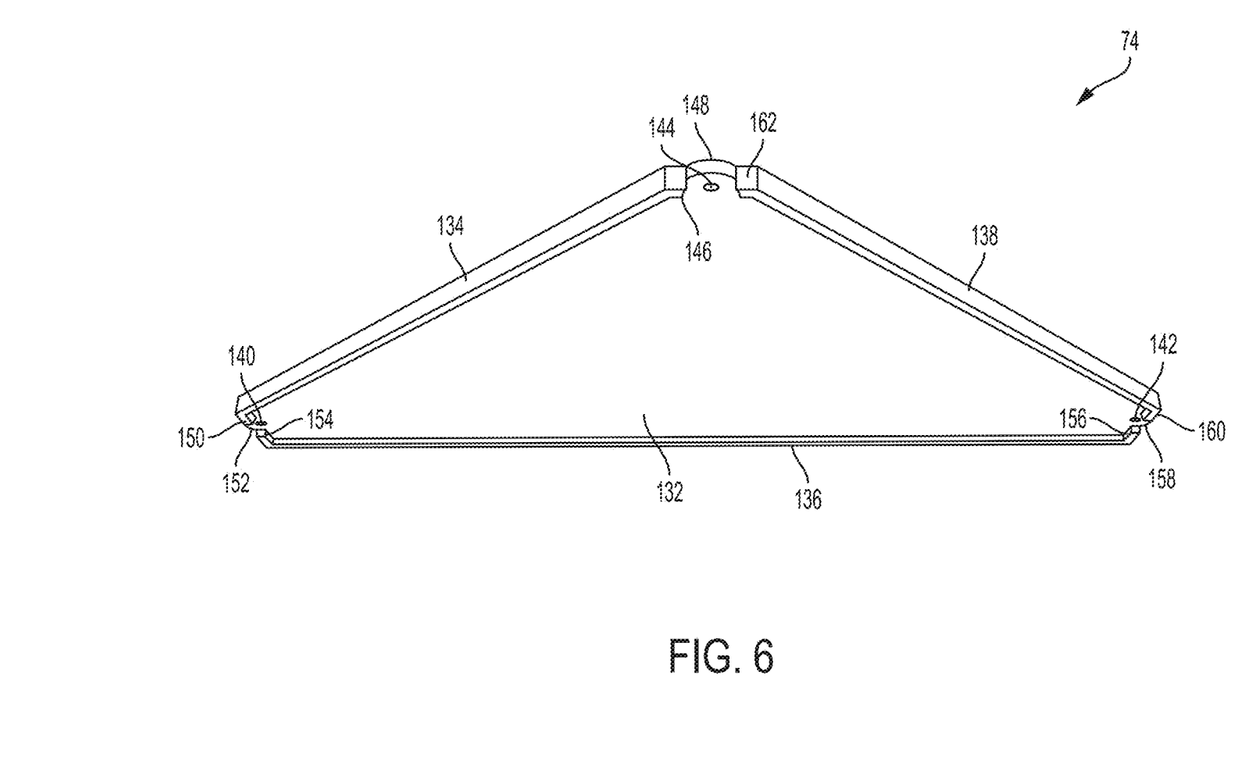
FIG. 6 is a perspective view of a cover of the microinverter of FIGS. 3 and 4.

Referring now to FIG. 6, cover 74 generally includes an upper wall 132 and three side walls 134, 136, 138. Upper wall 132 includes openings 140, 142, 144 which are located to align with bores 100, 92, 96 of housing 72 respectively. Openings 140, 142, 144 receive cover fasteners (not shown), which extend into bores 100, 92, 96 to secure cover 74 to housing 72. Side wall 134 includes a first projection 146 at a rounded corner 148 of upper wall 132 and a second projection 150 at a rounded corner 152 of upper wall 132. Side wall 136 includes a first projection 154 at rounded corner 152 and a second projection 156 at a rounded corner 158 of upper wall 132. Similarly, side wall 138 includes a first projection 160 at rounded corner 158 and a second projection 162 at rounded corner 148. Each pair of projections at rounded corners 148, 152, 158 engages flats in the corresponding corner sections 90, 98, 94 when cover 74 is attached to housing 72. Two such flats 164, 166 are depicted in FIG. 5. As should be apparent from the foregoing, cover 74 is placed onto upper edge 108 of housing 72 such that side walls 134, 136, 138 overhang housing side walls 82, 86, 84, respectively, and openings 140, 142, 144 align with bores 100, 92, 96, respectively. Then, fasteners such as screws (not shown) are used to secure cover 74 to housing 72 as indicated above.

Figure 7:
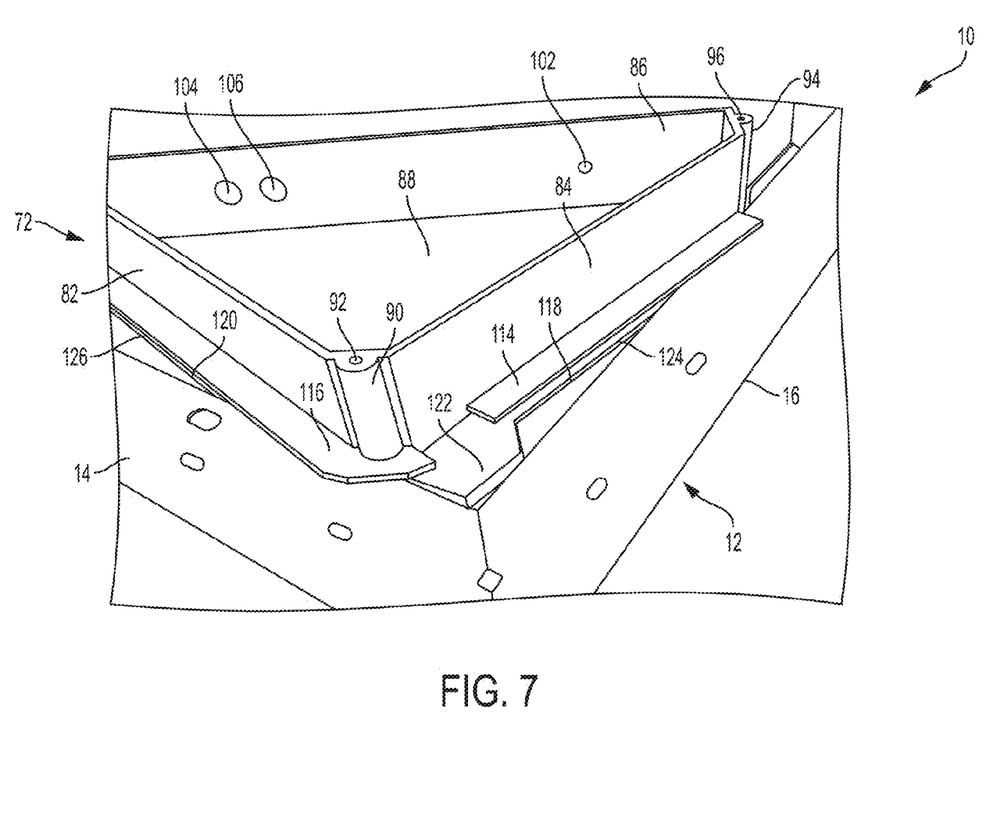
FIG. 7 is a perspective view of the housing of FIG. 5 being mounted to a solar panel.
Figure 8:
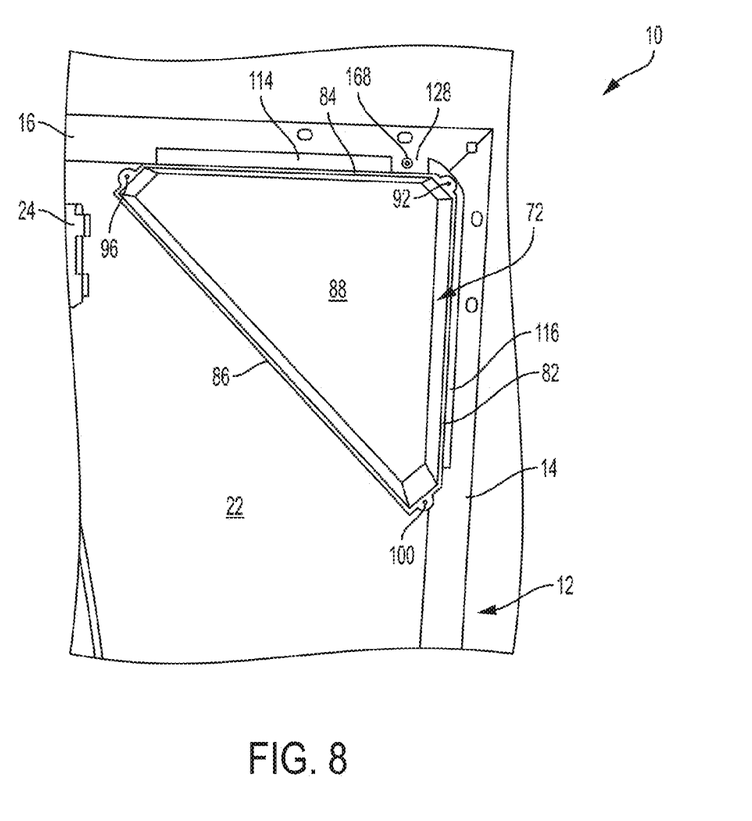
FIG. 8 is a rear view of the housing of FIG. 5 mounted to a solar panel.

FIG. 7 depicts housing 72 as it is being mounted to outer rail 12. As shown, rail segment 16 is received by channel 124 and rail segment 14 is received by channel 126. As housing 72 is slid into position in the corner between segments 14 and 16, mounting tab 122 is moved under rail segment 16. FIG. 8 shows housing 72 fully in position on outer rail 12. As shown, first upper wall segment 114 is positioned on top of rail segment 16 and second upper wall segment 116 is positioned on top of rail segment 14. A single fastener 168 such as a screw is used to secure housing 72 (and microinverter 60) to outer rail 12. Fastener 168 is driven through rail segment 16 at gap 128 such that it extends through rail segment 16 into opening 130 (FIG. 5) of mounting tab 122 which is positioned below rail segment 16. The positioning of housing 72 in the corner between rail segments 14, 16, and the engagement of rail segments 14, 16 in channels 126, 124, respectively of mounting flange 110, permit the use of single fastener 168 to prevent movement of microinverter 60 in any direction.

Figure 9:
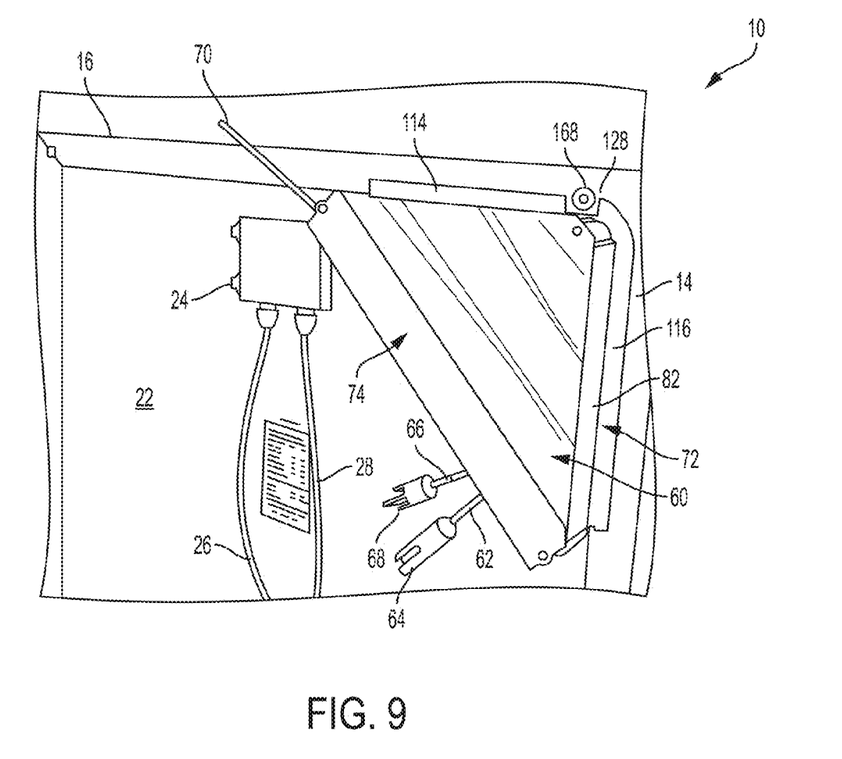
FIG. 9 is a perspective view of a microinverter according to the present invention mounted to a solar panel.
Figure 10:
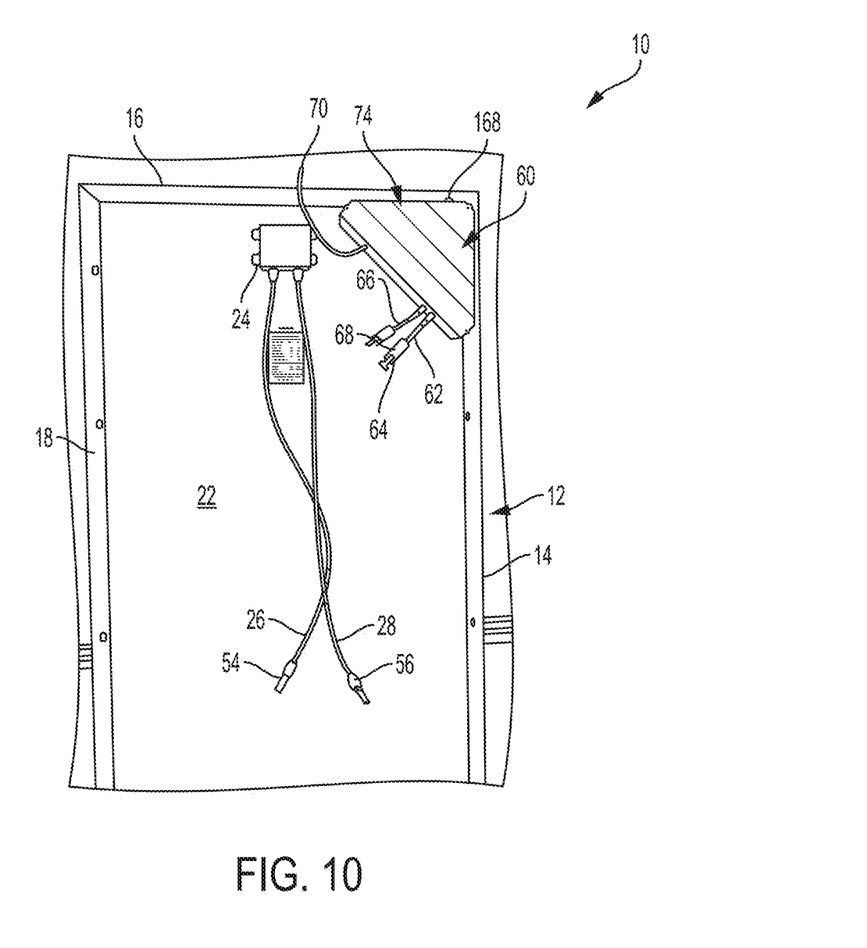
FIGS. 10 and 11 are rear views of a microinverter according to the present disclosure mounted to a solar panel.
Figure 11:
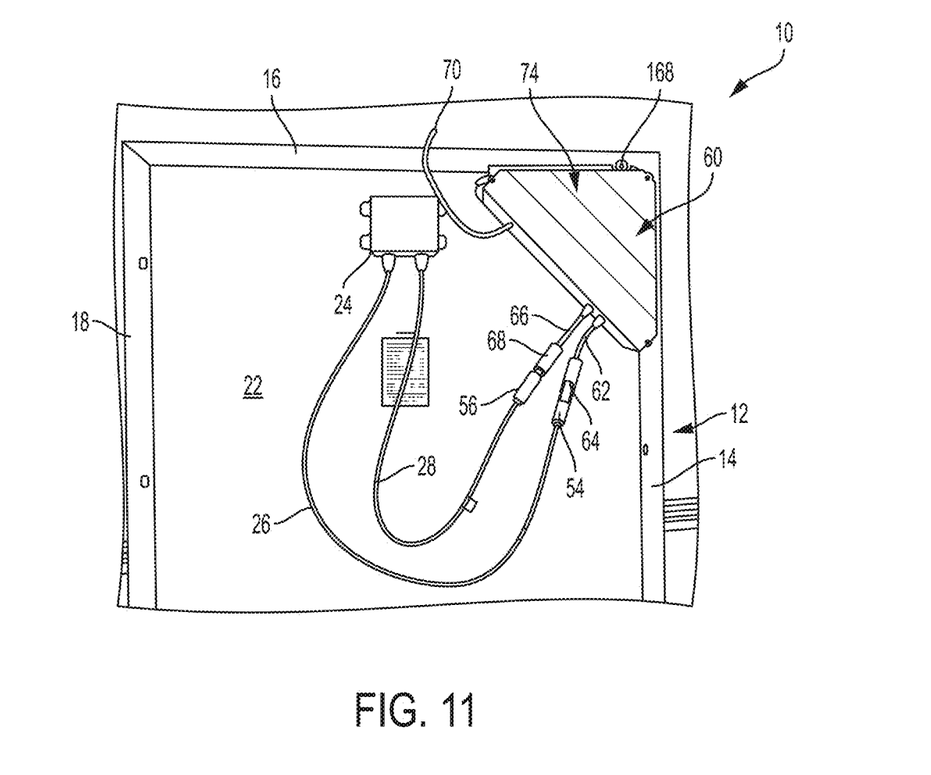
Figure 12:
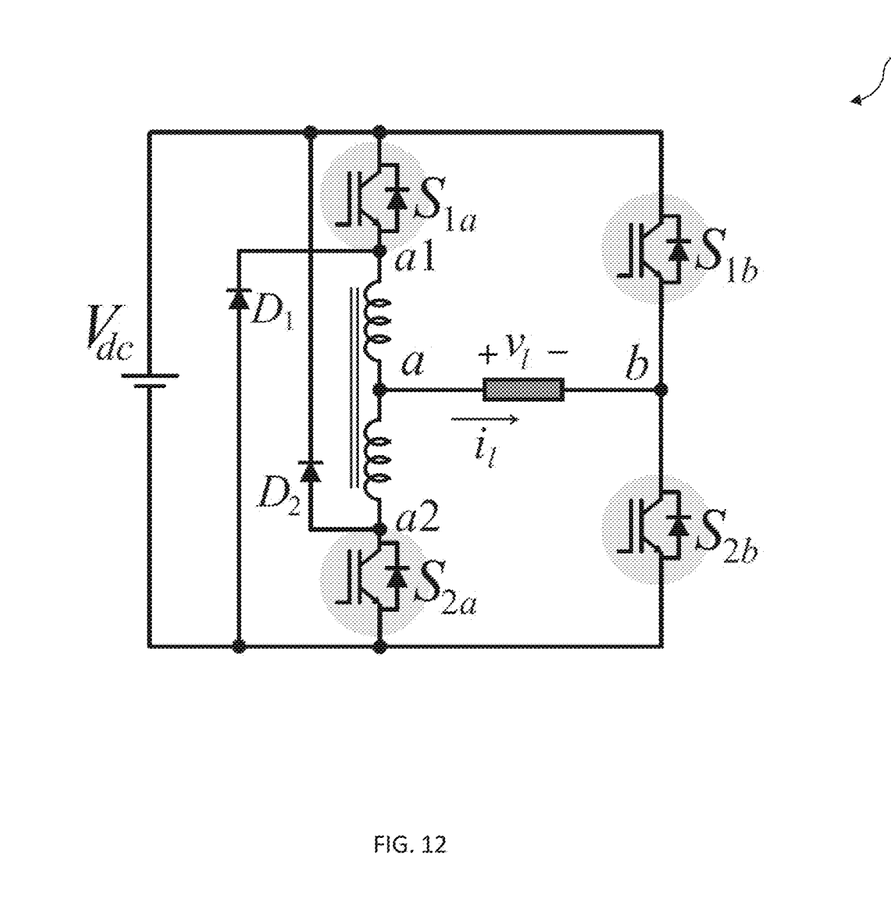
FIG. 12 is a schematic of electronics contained within a microinverter according to the present disclosure.
Figure 13:
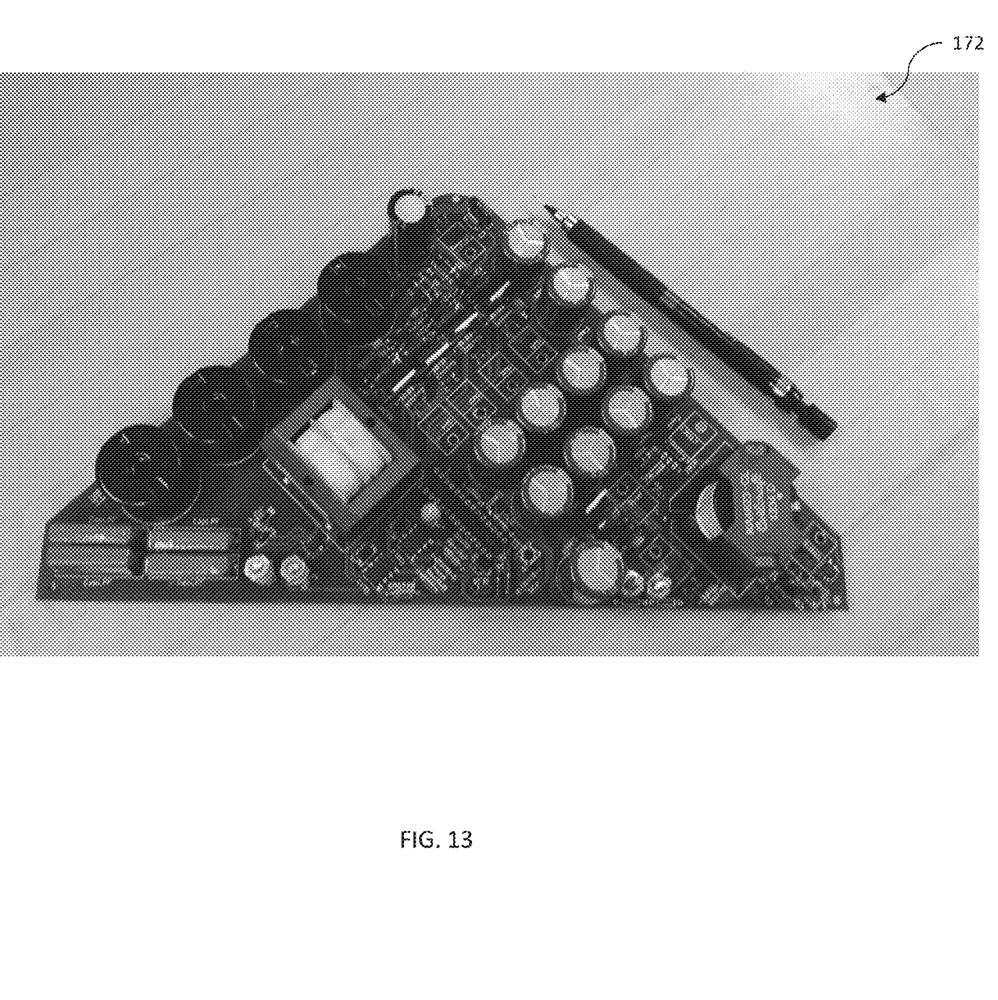
FIG. 13 is a top view of electronics contained within a microinverter according to the present disclosure.

FIGS. 9 and 10 depict a fully assembled microinverter 60 installed onto outer rail 12 prior to making the electrical connections to solar panel 10. FIG. 11 depicts microinverter 60 installed and electrically connected to solar panel 10. FIG. 12 depicts a schematic diagram of a converter circuit 170 that generates an AC output voltage with five levels using four switch elements. The full operation and configuration details of circuit 170 are described in detail in co-pending and co-owned U.S. patent application Ser. No. 14/465,289, entitled "Five-Level Four-Switch DC-AC Converter," filed Aug. 21, 2014, the entire contents of which being expressly incorporated herein by reference. FIG. 13 depicts a printed circuit board 172 which is mounted within housing 72 using known techniques, and which includes circuit 170 and other electronics as explained in the patent application referenced immediately above.

The above detailed description and the examples described therein have been presented for the purposes of illustration and description only and not by limitation. It is therefore contemplated that the present disclosure cover any and all modifications, variations or equivalents that fall within the spirit and scope of the basic underlying principles disclosed above and claimed herein.

What is claimed is:
1. A microinverter, comprising:
a housing;
a cover configured to connect to the housing; and
electronics mounted within the housing to convert direct current from a solar panel to alternative current;

wherein the housing includes
a first side wall,
a second side wall perpendicular to the first side wall, and
a mounting flange extending from the side walls, the mounting flange including a first channel configured to receive a first rail segment of the solar panel, a second channel configured to receive a second rail segment of the solar panel, and a mounting tab disposed between the channels to receive a fastener extending through one of the rail segments, thereby securing the housing to the solar panel with a single fastener,
wherein the first channel is formed by a first upper wall segment extending directly from the first side wall and a first lower wall segment extending directly from the first side wall, and the second channel is formed by a second upper wall segment extending directly from the second side wall and a second lower wall segment extending directly from the second side wall,
wherein the mounting tab extends continuously between and coplanar with the first lower wall segment and the second lower wall segment below a gap between the first upper wall segment and the second upper wall segment.

2. The microinverter of claim 1, wherein the housing further includes a third side wall that extends between the first and second side walls, and an end wall extending between the first, second and third side walls.

3. The microinverter of claim 2, wherein the side walls define a substantially triangular shape.

4. The microinverter of claim 1, further comprising a corner section disposed between the side walls and having a bore to receive a fastener for securing the cover to the housing.

5. The microinverter of claim 1, wherein the housing comprises molded plastic.

6. The microinverter of claim 1, wherein the cover comprises aluminum.

7. The microinverter of claim 4, wherein the cover comprises a first cover side wall that includes a first projection at the corner section.

8. The microinverter of claim 7, wherein the cover comprises a second cover side wall that includes a second projection at the corner section.

9. The microinverter of claim 8, wherein the housing comprises a first flat and a second flat.

10. The microinverter of claim 9, wherein the first projection and the second projection engage the first flat and the second flat.

11. A solar panel comprising:
an outer rail; and
a microinverter configured for mounting to the outer rail, wherein the microinverter comprises:
a housing;
a cover configured to connect to the housing; and
electronics mounted within the housing to convert direct current from the solar panel to alternative current;
wherein the housing includes
a first side wall,
a second side wall perpendicular to the first side wall, and a mounting flange extending from the side walls, the mounting flange including a first channel configured to receive a first rail segment of the solar panel, a second channel configured to receive a second rail segment of the solar panel, and a mounting tab disposed between the channels to receive a fastener extending through one of the rail segments, thereby securing the housing to the solar panel with a single fastener,
wherein the first channel is formed by a first upper wall segment extending directly from the first side wall and a first lower wall segment extending directly form the first side wall, and the second channel is formed by a second upper wall segment extending directly from the second side wall and a second lower wall segment extending directly from the second side wall,
wherein the mounting tab extends continuously between and coplanar with the first lower wall segment and the second lower wall segment below a gap between the first upper wall segment and the second upper wall segment.

12. The solar panel of claim 11, wherein the microinverter is mounted to the outer rail.

13. The solar panel of claim 11, wherein the housing further includes a third side wall that extends between the first and second side walls, and an end wall extending between the first, second and third side walls.

14. The solar panel of claim 13, wherein the side walls define a substantially triangular shape.

15. The microinverter of claim 11, further comprising a corner section disposed between the side walls and having a bore to receive a fastener for securing a cover to the housing.

16. The microinverter of claim 11, wherein the housing comprises molded plastic.

17. A solar panel comprising:
an outer rail;
a converter that generates an AC output voltage with five levels using four switch elements; and
a microinverter configured for mounting to the outer rail, wherein the microinverter comprises:
a housing;
a cover configured to connect to the housing; and
electronics mounted within the housing to convert direct current from the solar panel to alternative current;
wherein the housing includes
a first side wall,
a second side wall perpendicular to the first side wall, and a mounting flange extending from the side walls, the mounting flange including a first channel configured to receive a first rail segment of the solar panel, a second channel configured to receive a second rail segment of the solar panel, and a mounting tab disposed between the channels to receive a fastener extending through one of the rail segments, thereby securing the housing to the solar panel with a single fastener,
wherein the first channel is formed by a first upper wall segment extending directly from the first side wall and a first lower wall segment extending directly from the first side wall, and the second channel is formed by a second upper wall segment extending directly from the second side wall and a second lower wall segment extending directly from the second side wall,
wherein the mounting tab extends continuously between and coplanar with the first lower wall segment and the second lower wall segment below a gap between the first upper wall segment and the second upper wall segment.

18. The solar panel of claim 17, further comprising a printed circuit board mounted within the housing.

\* \* \* \* \*